United States Patent [19]

Anderson

[11] 4,296,778
[45] Oct. 27, 1981

[54] ANTI-BACKFLOW VALVE FOR SEWER TRAPS

[76] Inventor: Alonzo B. Anderson, 1238 Pagos Ave., Salt Lake City, Utah 84117

[21] Appl. No.: 66,088

[22] Filed: Aug. 13, 1979

[51] Int. Cl.³ .......................... F16K 31/22; F16K 33/00
[52] U.S. Cl. .......................................... 137/433; 4/287; 137/454.2
[58] Field of Search .................... 4/287, 295; 137/429, 137/430, 433, 454.2, 202, 315; 251/368

[56] References Cited

U.S. PATENT DOCUMENTS

| 844,003 | 2/1907 | Conrad | 137/433 |
|---|---|---|---|
| 1,423,679 | 7/1922 | Pavitchich | 137/433 |
| 1,982,555 | 11/1934 | Van Der Horst | 137/433 |
| 2,758,664 | 8/1956 | Koenig | 137/433 |
| 2,787,376 | 4/1957 | Coulson | 137/433 |
| 3,747,894 | 7/1973 | Pepper | 251/368 |
| 3,768,505 | 10/1973 | Benke | 137/433 |
| 4,088,149 | 5/1978 | Logsdon | 137/433 |

*Primary Examiner*—Arnold Rosenthal
*Assistant Examiner*—G. L. Walton
*Attorney, Agent, or Firm*—K. S. Cornaby

[57] ABSTRACT

An anti-backflow valve for sewer traps or catch basins is adapted to automatically prevent the undesirable backflow of sewer water upwardly through a trap, but provides for the normal downflow of water through the trap into the sewer. Such valve arrangement has a top or floor plate for insertion over the top of a conventional catch basin with a slotted valve housing extending downwardly from the floor plate. A conically-shaped sealing member is slidingly disposed for vertical movement within the housing to seal or unseal the trap. An elongate downwardly-extending guide member is attached to the underside of the conically-shaped sealing member. A bottom plate is detachably mounted to the underside of the valve housing and is provided with apertures therein to permit the flow-through of water. The center of the bottom plate is provided with a guide means for slidingly holding the downwardly-extending guide member to prevent canting or misalignment of the sealing member as it slides vertically in the housing.

6 Claims, 4 Drawing Figures

U.S. Patent Oct. 27, 1981 4,296,778
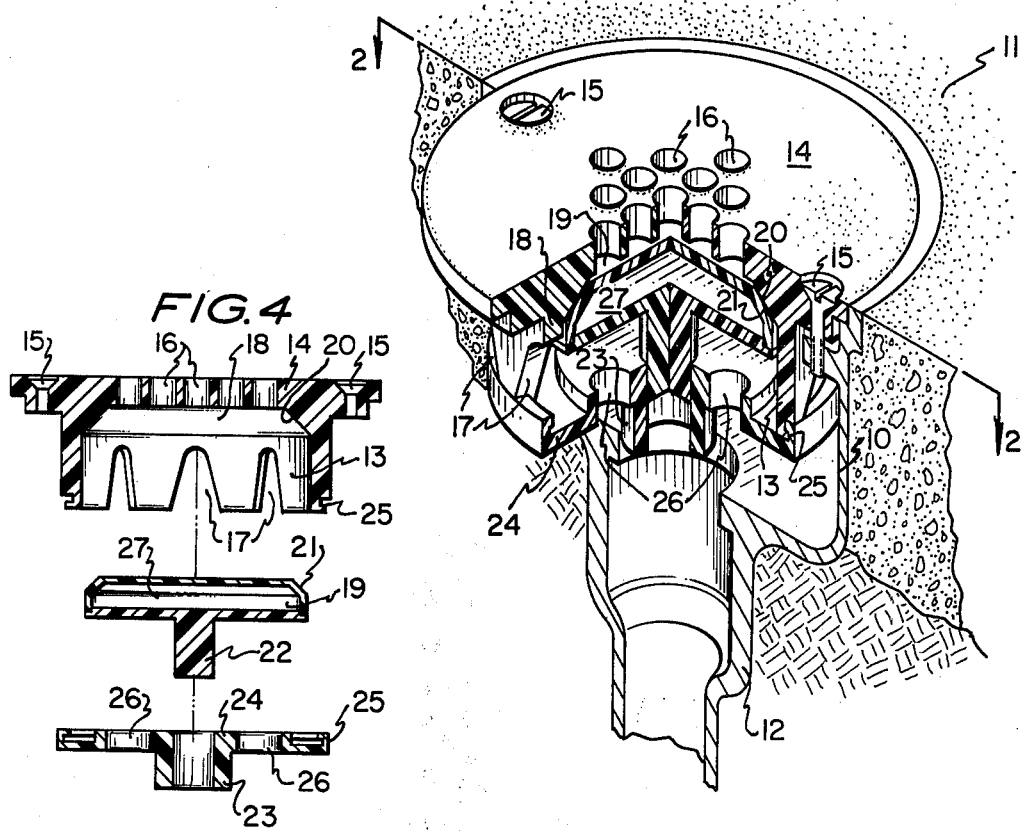
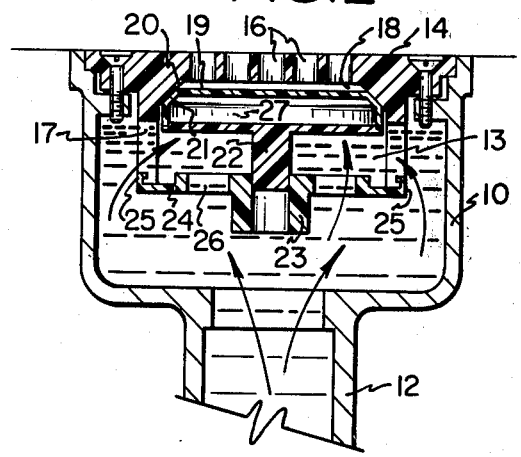
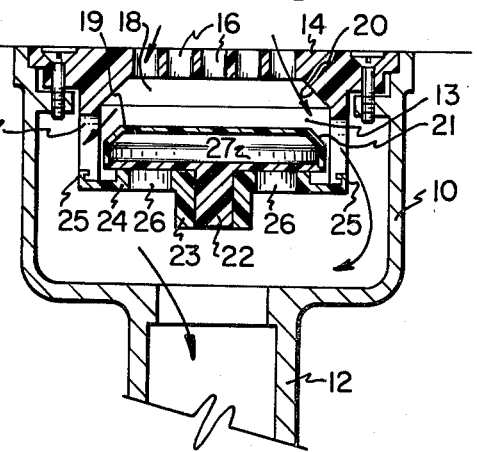

ANTI-BACKFLOW VALVE FOR SEWER TRAPS

BACKGROUND OF THE INVENTION

Ever since floor drains have been connected to sewer lines, the problem of backflow of sewer water from plugged sewer lines has been with us. The problem is especially acute in homes and commercial buildings having basements with floor drains.

Many attempts have been made to alleviate the problem by preventing the sewer water backflow from entering the floor drain catch basin or from emerging from the catch basin through the perforated floor cover plate into the basement. Such elaborate prior art attempts have included those disclosed in U.S. Pat. No's. 662,711; 714,006; 1,269,640; 2,062,423; 2,504,474; and 2,638,178. These attempts extend from as early as 1900, testifying to the perceived need for a solution.

The prior art disclosures are concerned principally with hinged closures secured within specially built traps and adapted to close when a backflow of water occurred. Others included a ball closure which was either free-floating or secured by a lock key or spigot handle which could be actuated by hand when the user detected water flowing from the drain.

None of the prior art devices were commercially successful despite the obvious and continuing need. Those devices requiring specially constructed traps could not be used in existing catch basin installations without chiseling the catch basin from the usually cement basement floor. Those devices operating on a side-hinge principle were found to become easily misaligned and failed to seal properly when the upward rush of sewer water occurred. Others requiring manual operation to close the valves were of little value when the property owner did not have advance notice of an impending sewer backflow.

It is therefore an object of this invention to provide a backflow valve means which can be installed in existing conventional catch basins.

It is also an object of this invention to provide a fail-safe non-hinged valving means which cannot misalign or fail to seal.

SUMMARY OF THE INVENTION

The anti-backflow valve means of this invention has an upper perforated plate cover member adapted to be attached to the top or floor-level side of a conventional catch basin. A slotted valve housing depends downwardly from the underside of the cover member and has an open lower side which is adapted to receive and hold a bottom plate means having apertures therein to facilitate the flow of water therethrough.

A conical sealing member is slidingly disposed within the valve housing and is adapted to reciprocate vertically within the housing and to seat itself against a sealing ring at the upper end of the housing to prevent the upward flow of water. The sealing member is buoyant in water and has a downwardly-extending elongate guide member which is attached to the underside of the sealing member.

The bottom plate means has guide receiving means in the center thereof for holding the guide member and permitting the guide member to reciprocate vertically in the guide receiving means.

Under normal circumstances, when water is flowing into the drain from the floor, the sealing member is located in the lower position, resting upon the bottom plate means and permitting the water to flow downwardly into the sewer. When a backflow of water takes place, with water flowing upwardly from the sewer into the catch basin, the sealing member floats to the top of the housing and seals the perforated top plate, thereby stopping the flow of sewer water through the perforated plate. When the back pressure subsides, the sealing member drops back to its lower position to rest upon the bottom plate.

THE DRAWINGS

A preferred embodiment of the invention is illustrated in the accompanying drawing in which:

FIG. 1 is a partially sectioned perspective of a drain catch basin showing the anti-backflow valve mechanism in place;

FIG. 2, a side elevational section taken along Line 2—2 of FIG. 1, showing the sealing member in the upper sealing position in the housing;

FIG. 3, a side elevational section dimilar to that shown in FIG. 2, showing the sealing member in the lower or open position; and FIG. 4, an exploded sectional view of the housing, sealing member and bottom plate.

DETAILED DESCRIPTION OF THE ILLUSTRATED EMBODIMENT

As shown in FIGS. 1, 2, 3 and 4, a preferred embodiment of the anti-backflow valve mechanism is mounted in a conventional catch basin or trap, which in turn is illustrated in FIG. 1 as set in a cement floor 11, such as in a basement. A drain pipe 12 extends downwardly from the underside of catch basin 10, both of which are customarily constructed of cast iron or other acid-impervious material.

The valve mechanism has a normally cylindrical valve housing 13, which is disposed within catch basin 10. Housing 13 has a perforated cover or top plate 14 which is adapted to be attached to catch basin 10 by means of screws 15 or the like, and is preferably mounted flush with floor 11. Cover plate 14 has a plurality of apertures 16 therein providing for the flow of water downwardly from floor 11 into catch basin 10, as illustrated by the flow lines in FIG. 3.

The main cylindrical body of valve housing 13 extends downwardly into catch basin 10 from the underside of cover plate 14 and is preferably integral with cover plate 14. The cylindrical sides of housing 13 have a plurality of vents or ports 17 spaced about the circumference thereof to provide for water-flow downwardly into drain pipe 12 from apertures 16 in cover plate 14.

The upper end of housing 13 just below cover plate 14 has a circumferential sealing seat 18 for receiving the upper end of a cylindrical sealing member 19. Both sealing seat 18 and sealing member 19 have in this embodiment mutually cooperating beveled edges 20, 21, which ensure a water-tight seal as sealing member 19 is floated upwardly against seat 18, as illustrated in FIG. 2. Beveled edges 20, 21 guide sealing member 19 into a tight fit with seat 18, and aid in eliminating misalignment of member 19.

The underside of sealing member 19 has a downwardly extending elongate guide member 22 which is adapted to slidingly reciprocate within a hollow guide way member 23 disposed in the center of a bottom plate 24. Bottom plate 24 is attached to the open bottom side of housing 13 by appropriate means, in this embodiment an interlocking male-female snap mechanism 25. As sealing member 19 reciprocates up and down in response to the flow of water, as shown in FIGS. 3 and 4, the movement of guide member 22 within guide way member 23 helps assure that sealing member 19 is not misaligned or canted against a wall of housing 13. Bottom plate 24 also is provided with a plurality of apertures 26 to aid in the flow of water through the valve mechanism.

The valve mechanism can be constructed of high-impact, acid-impervious plastic material, and lends itself to the extrusion molding process. Other suitable materials can be employed. The interior of sealing member 19 can be a hollow void 27, or filled with a foamable material to aid in providing bouyancy to the sealing member.

The size of the valve mechanism can vary so long as it can fit into a catch basin without plugging the drain pipe or hindering the downward flow of water from the floor.

It is to be understood that particular forms of the invention described herein and illustrated in the accompanying drawings are preferred embodiments. Various changes in shape, size, materials, and arrangement of parts, including substantial equivalents, can be made without departing from the scope of the invention as defined in the attached claims.

I claim:

1. An anti-backflow valve for installation in a sewer catch basin, comprising in combination:
a valve housing having an upper cover plate for attachment to a catch basin and an open lower end; said valve housing being adapted for mounting within a catch basin; said valve housing having first fluid flow apertures therein;
an upper sealing seat means disposed within the upper end of said valve housing;
a bouyant sealing member reciprocatingly disposed within said valve housing for vertical movement and having means for sealing upwardly against said upper sealing seat to shut-off fluid flow through said first apertures, said sealing member having a downwardly extending elongate guide member attached thereto;
a detachable bottom plate means for mounting on the bottom side of said valve housing, said bottom plate means includes second fluid flow apertures for permitting fluid flow therethrough in an upward direction to move said sealing member against said sealing seat means to shut-off fluid flow through said first apertures and to prevent upward fluid flow simultaneously, and when said sealing member moves downwardly said first apertures are open to fluid therethrough and the second apertures are closed to upward fluid therethrough by said sealing member, and said bottom plate means having a guide way member for receiving and reciprocatingly holding said guide member of said sealing member.

2. A valve as set forth in claim 1, wherein said sealing member is hollow.

3. A valve as set forth in claim 1, wherein said valve housing and said bottom plate are of unitary construction.

4. A valve as set forth in claim 1, wherein said valve components are constructed of thermoplastic materials.

5. A valve as set forth in claim 1, wherein said upper sealing seat means comprises a beveled surface at the inner perimeter edge of said upper cover plate and said bouyant sealing member has a cooperating beveled surface in the upper perimeter edge.

6. A valve as set forth in claim 1, wherein said downwardly-extending elongate guide member is cylindrical in shape.

* * * * *